(12) United States Patent
Lewis et al.

(10) Patent No.: US 7,359,325 B1
(45) Date of Patent: Apr. 15, 2008

(54) METHOD AND APPARATUS FOR INSERTING EMPTY MEMORY CELLS INTO A DATA FLOW OF NETWORK CONNECTIONS OF A COMPUTER NETWORK

(75) Inventors: Stephen John Lewis, Perth (AU); Nils Ramon Marchant, Ocean Reef (AU); Mike Reynolds, Subiaco (AU)

(73) Assignee: Network Equipment Technologies, Inc., Fremont, CA (US)

( * ) Notice: Subject to any disclaimer, the term of this patent is extended or adjusted under 35 U.S.C. 154(b) by 842 days.

(21) Appl. No.: 10/045,290

(22) Filed: Oct. 18, 2001

(51) Int. Cl.
*H04L 12/26* (2006.01)

(52) U.S. Cl. .............. 370/230.1; 370/235; 370/395.3

(58) Field of Classification Search ............ 370/230, 370/230.1, 235, 236.2, 241.1, 252, 392, 295.21, 370/395.3, 395.31, 395.41, 458, 528
See application file for complete search history.

(56) References Cited

U.S. PATENT DOCUMENTS

| | | | |
|---|---|---|---|
| 5,592,476 A * | 1/1997 | Calamvokis et al. ........ | 370/390 |
| 5,602,841 A | 2/1997 | Lebizay et al. | |
| 5,689,499 A * | 11/1997 | Hullett et al. ............... | 370/235 |
| 5,881,312 A * | 3/1999 | Dulong ........................... | 710/7 |
| 5,966,163 A * | 10/1999 | Lin et al. ..................... | 725/117 |
| 5,999,980 A * | 12/1999 | Tanaka et al. ............... | 709/235 |
| 6,084,869 A | 7/2000 | Fishman et al. | |
| 6,167,030 A | 12/2000 | Kilkki et al. | |
| 6,404,737 B1 * | 6/2002 | Novick et al. ............ | 370/235.1 |
| 6,452,915 B1 | 9/2002 | Jorgensen | |
| 6,487,202 B1 | 11/2002 | Klausmeier et al. | |
| 6,532,234 B1 | 3/2003 | Yoshikawa et al. | |
| 6,549,992 B1 | 4/2003 | Armangau et al. | |
| 6,556,578 B1 | 4/2003 | Silberschatz | |
| 6,606,301 B1 * | 8/2003 | Muller et al. ............... | 370/230 |
| 6,618,390 B1 | 9/2003 | Erimli et al. | |
| 6,687,225 B1 * | 2/2004 | Kawarai et al. ......... | 370/230.1 |
| 6,785,236 B1 | 8/2004 | Lo et al. | |
| 6,788,697 B1 | 9/2004 | Aweya et al. | |
| 6,820,128 B1 | 11/2004 | Firoiu et al. | |
| 6,829,224 B1 | 12/2004 | Goldman et al. | |
| 6,856,596 B2 | 2/2005 | Blumer et al. | |
| 6,868,065 B1 | 3/2005 | Kloth et al. | |
| 6,870,854 B1 | 3/2005 | Aimoto et al. | |

(Continued)

OTHER PUBLICATIONS

U.S. Appl. No. 10/035,791, Cole et al.
U.S. Appl. No. 10/045,187, Lowpensky.

*Primary Examiner*—Chi Pham
*Assistant Examiner*—Shick Hom
(74) *Attorney, Agent, or Firm*—Townsend and Townsend and Crew

(57) ABSTRACT

A method and an apparatus are provided for inserting empty memory cells into a data flow of network connections of a computer network. In one example, the method includes receiving an insertion request for an empty memory cell to be inserted into the data flow. A base connection identification (CID) associated with the insertion request is also received. An appropriate insertion scheme for carrying out the insertion request is determined. Based on the appropriate insertion scheme, the insertion request is sent to an insertion device that is configured to insert the empty memory cell into the data flow. The memory cell is inserted prior to traffic shaping of the data flow.

37 Claims, 10 Drawing Sheets

U.S. PATENT DOCUMENTS

| | | |
|---|---|---|
| 6,894,969 B1 * | 5/2005 | Chidambaran et al. ..... 370/216 |
| 6,904,015 B1 | 6/2005 | Chen et al. |
| 6,918,005 B1 * | 7/2005 | Marchant et al. ........... 711/113 |
| 2002/0176424 A1 | 11/2002 | Knight et al. |
| 2002/0176430 A1 | 11/2002 | Sangha et al. |
| 2002/0194436 A1 | 12/2002 | McKenney |
| 2003/0002505 A1 * | 1/2003 | Hoch et al. ................. 370/392 |
| 2005/0175014 A1 | 8/2005 | Patrick |

* cited by examiner

US 7,359,325 B1

METHOD AND APPARATUS FOR INSERTING EMPTY MEMORY CELLS INTO A DATA FLOW OF NETWORK CONNECTIONS OF A COMPUTER NETWORK

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

The present application is related to U.S. patent application Ser. No. 10/045,187, entitled "METHOD AND APPARATUS FOR RANDOM EARLY DETECTION OF DATA PACKETS OF NETWORK CONNECTIONS", filed Oct. 18, 2001; and is also related to U.S. patent application Ser. No. 10/035,791, entitled "METHOD AND APPARATUS FOR DISCARDING A PRIORITIZED FAIR SHARE OF TRAFFIC OF NETWORK CONNECTIONS", filed Oct. 18, 2001; and is also related to U.S. patent application Ser. No. 10/045,288 (now U.S. Pat. No. 6,918,005), entitled "METHOD AND APPARATUS FOR CACHING FREE MEMORY CELL POINTERS", filed Oct. 18, 2001; the disclosures of which are herein incorporated by reference.

FIELD OF THE INVENTION

The present invention generally relates to quality of service of computer networks, such as the Internet. The present invention more particularly relates to managing the bandwidth available amongst a set of network connections of a computer network.

DISCUSSION OF BACKGROUND

It is hard to dismiss the entrepreneurial nature of the Internet; this is no longer a research project. For most organizations connected to the global Internet, the Internet is a full-fledged business interest. Having said that, it is equally hard to dismiss the poor service quality that is frequently experienced. The rapid growth of the Internet, and increasing levels of traffic, make it difficult for Internet users to enjoy consistent and predictable end-to-end levels of service quality.

The Internet has historically offered a single level of service, that of "best effort," where all data packets are treated with equity in the network. However, we are finding that the Internet itself does not offer a single level of service quality, and some areas of the network exhibit high levels of congestion and consequently poor quality, while other areas display consistent levels of high quality service. Customers are now voicing a requirement to define a consistent service quality they wish to be provided, and network service providers are seeking ways in which to implement such a requirement. This effort is happening within the umbrella called "Quality of Service" (QoS). Examples of factors that affect QoS on the Internet include delay, bandwidth, and reliability.

Delay is the elapsed time for a packet to be passed from the sender, through the network, to the receiver. The higher the delay, the greater the stress that is placed on the transport protocol to operate efficiently. For Transfer Control Protocol (TCP), higher levels of delay imply greater amounts of data held "in transit" in the network, which in turn places stress on the counters and timers associated with the protocol. It should also be noted that TCP is a "selfclocking" protocol, where the sender's transmission rate is dynamically adjusted to the flow of signal information coming back from the receiver, via the reverse direction acknowledgments (ACK's), which notify the sender of successful reception. The greater the delay between sender and receiver, the more insensitive the feedback loop becomes, and therefore the protocol becomes more insensitive to short term dynamic changes in network load. For interactive voice and video applications, the introduction of delay causes the system to appear unresponsive.

Bandwidth is the maximal data transfer rate that can be sustained between two end points. It should be noted that this is limited not only by the physical infrastructure of the traffic path within the transit networks, which provides an upper bound to available bandwidth, but is also limited by the number of other flows which share common components of this selected end-to-end path.

Reliability is commonly considered a property of the transmission system, and in this context, it can be thought of as the average error rate of the medium. Reliability can also be a byproduct of the switching system. A poorly configured or poorly performing switching system can alter the order of packets in transit, delivering packets to the receiver in a different order than that of the original transmission by the sender, or even dropping packets through transient routing loops.

The Internet is composed of a collection of routers and transmission links. Routers receive an incoming packet, determine the next hop interface, and place the packet on the output queue for the selected interface. Transmission links have characteristics of delay, bandwidth and reliability. Poor service quality is typically encountered when the level of traffic selecting a particular hop exceeds the transmission bandwidth of the hop for an extended period time. In such cases, the router's output queues associated with the saturated transmission hop begin to fill, causing additional transit delay, until the point is reached where the queue is filled, and the router is then forced to discard packets or at least portions of packets (reduced reliability). This in turn forces adaptive flows to reduce their sending rate to minimize congestion loss, reducing the available bandwidth for the application.

Unfortunately, present methods of managing bandwidth, delay, and reliability have been inadequate, given the increasingly demanding transmission needs of users of the Internet.

SUMMARY OF THE INVENTION

It has been recognized that what is needed is an inexpensive, efficient technique for improving bandwidth, delay, and reliability of a network connection. Broadly speaking, the present invention fills these needs by providing a method and an apparatus for inserting empty memory cells into a data flow of network connections of a computer network. It should be appreciated that the present invention can be implemented in numerous ways, including as a process, an apparatus, a system, a device or a method. Several inventive embodiments of the present invention are described below.

In one embodiment, a method is provided for inserting empty memory cells into a data flow of network connections of a computer network. The method comprises the following: receiving an insertion request for an empty memory cell to be inserted into the data flow; receiving a base connection identification (CID) associated with the insertion request; determining an appropriate insertion scheme for carrying out the insertion request; and based on the appropriate insertion scheme, sending the insertion request to an insertion device configured to insert the empty memory cell into the data flow.

In another embodiment, an integrated circuit is provided that is configured to insert empty memory cells into a data flow of, network connections of a computer network. The integrated circuit comprises controller circuitry configured to control operations of the following: receiving an insertion request for an empty memory cell to be inserted into the data flow; receiving a base connection identification (CID) associated with the insertion request; determining an appropriate insertion scheme for carrying out the insertion request; and based on the appropriate insertion scheme, sending the insertion request to an insertion device configured to insert the empty memory cell into the data flow.

Advantageously, the present invention demonstrates that high quality of service (QoS) is possible in the Internet, even with increasingly demanding transmission requirements. The present invention makes it possible to deliver best effort traffic in a manner which is predictable and fairly consistent. For example, the present invention deals with problems that may arise when it is necessary to insert data into an incessant stream of data flow.

The invention encompasses other embodiments of a method, an apparatus, and a computer-readable medium, which are configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DESCRIPTION OF THE PREFERRED EMBODIMENTS

Figure 1:
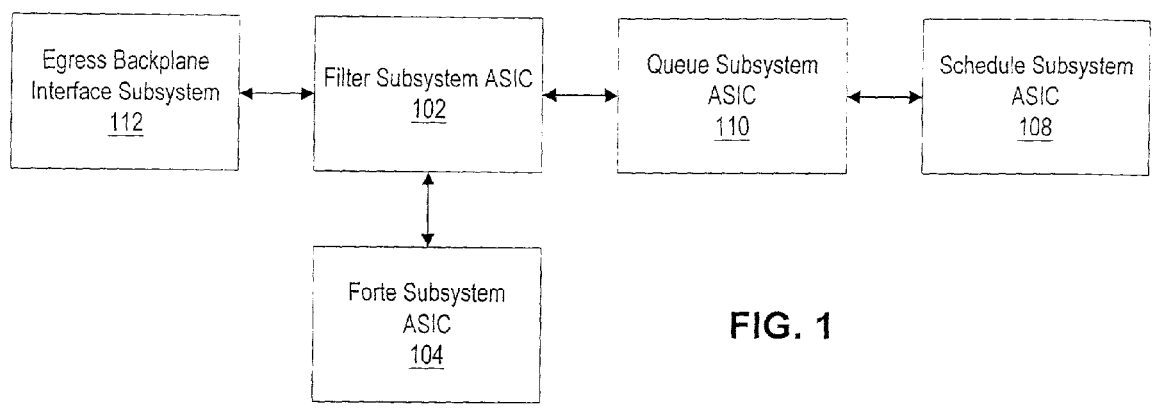
FIG. 1 shows the environment in which the Forte subsystem ASIC operates, in accordance with one embodiment of the present invention.

An invention is disclosed for a method and an apparatus for inserting empty memory cells into a data flow of network connections of a computer network. Numerous specific details are set forth in order to provide a thorough understanding of the present invention. It will be understood, however, to one skilled in the art, that the present invention may be practiced without some or all of these specific details.

The list below provides a quick reference to acronyms used in this disclosure.

AAL5—ATM Adaptation Layer Type 5—single bit field in CD which indicates that cells on a connection constitute CPAAL5_PDU packets.

ABR—Available Bit Rate—QoS traffic class defined by the ATM Forum.

ABRC—ABR Controller inside the Forte.

APR DC—ABR daughtercard.

ABRQCount—Count of the number of cells which have passed on the ABR QueueID since the most recent ABRQFill report to the ABR daughtercard.

ABRQFill—Count of the number of cells in the cell buffer on the ABR QueueID.

AIS—Alarm Indication Status

AvgOccCIDs—Average of NumOcoCIDs.

BPC—Back Pressure Controller.

BERT—Built-in External Ram Test.

BRC—Backward Reporting Cell.

b-RM—backwards RM cell for ABR connections.

CAC—Connection Admission Control—Network Management system level process which controls usage of bandwidth by connections.

CB—Circular Buffer.

CBR—Continuous Bit Rate.

CCP—Cell Control Path.

CCR—ABR Current Cell Rate.

CD—CellDescriptor—the collection of fields used by the Cell Control Path to identify one cell.

CDByp—CD which traverses the FSS Bypass block to bypass the remainder of the Cell Control Path.

CDDisc—CD processed by Discard block.

CDexEB—CD received by FSS from Egress Backplane Interface Subsystem.

CDexQSS—CD received by FSS from QSS.

CDP—Cell Data Path.

CDtoEB—CD from FSS to Egress Processor subsystem.

CDtoQSS—CD from FSS to QSS.

CellPtr—Cell pointer—address of cell in the Cell Buffer.

CID—ConnectionID—the 16 bit identifier which binds a call to a connection between an incoming VPI/VCI and an outgoing VPI/VCI.

CIDCount—per-CID cell buffer occupancy.

CLP—Cell Loss Priority—ATM Cell Header field in which cell is 'tagged'.

CPU—Central Processing Unit—Management Processor which monitors and controls the SIF board and provides the interface to the network management.

CRC—Cyclic Redundancy Check.

DR—Discard (external) RAM.
EBISS—Egress Backplane Interface subsystem.
EOC—Egress Output Controller.
EOF—End of Frame—flag which indicates the end of a CPAALS_PDU (packet).
EPSS—.Egress Processor Subsystem.
ER—ABR Explicit Rate.
f-RM—Forward RM cell of ABR connections.
FMC—Forward Monitoring Cell.
FSS—Filter Subsystem.
HEC—Header Error Check.
ICI—Ingress Connection Identifier.
Int—Interrupt.
IPSS—Ingress Processor Subsystem.
ITSS—Ingress Timing Subsystem.
LIM—Line Interface Module—physical layer transceiver card.
MCR—ABR Minimum Cell Rate.
MR—Multicast (external) RAM.
MTS—Main Timing Sequence—fixed length sequence of ASIC clock cycles.
Nrm—Number of RM cells—ATM Forum defined integer which defines the cell spacing between RM cells.
NRT—Non Real Time—traffic class which is not sensitive to cell delay or cell delay variation.
OAM—Operations Administration and Maintenance (cell).
PID—Port Identifier—5 bit CD field which identifies destination ALM output port.
PMG—Performance Monitoring Group.
PMID—PMG Identifier.
PortID—Egress port ID.
PR—Pointer (external) RAM.
PTI—Payload Type Identifier—ATM Cell Header field.
QueueID—Queue Identifier—4 bit field priority field (0 is highest).
QID—QueueID—4 bit field priority field (0 is highest).
QoS—Quality of Service.
QSS—Queue Subsystem.
RdPtr—Read Pointer which obtains information from head of free list or circular buffer.
RM—Resource Management cell in which ABR flow control information is carried.
RMdir—RM Cell Direction bit—single bit field in CD which indicates whether RM cell is forward or backward.
rt-VBR—real time VBR.
SAR—Segmentation and Reassembly cell to CPU.
SIP—Switching Interface.
SIFT 622 Mbps switch interface card
SIF2—2.4 Gbps switch interface card
SSS—Scheduling Subsystem.
Th—Threshold.
UTOPIA—Universal Test & Operations PHY Interface for ATM.
VBR—Variable Bit Rate.
VCI—Virtual Channel Identifier—ATM Cell Header field.
VD—Virtual Destination for ABR connections.
VDfRM—ABR Virtual Destination forward RM cell.
VPI—Virtual Path Identifier—ATM Cell Header field.
VS—Virtual Source for ABR connections.
VSCount—number of cells since most recent VS f-RM cell.
VSfltM—ABR Virtual Source forward RM cell.
WrPtr—Write Pointer which appends information to a linked list or circular buffer.

General Overview

FIG. 1 shows the environment in which the Forte subsystem ASIC 104 operates, in accordance with one embodiment of the present invention. The Forte ASIC 104 includes controller circuitry configured to control operations of the insertion of memory cells. The Forte ASIC 104 is in electrical communication with a Filter subsystem ASIC (FSS) 102 a Queue subsystem ASIC (QSS) 110, a Schedule subsystem ASIC (SSS) 108, and an egress backplane interface subsystem (EBISS) ASIC 112. These subsystems are further discussed below with reference to FIG. 2 through FIG. 11. The given names (e.g., "Filter," "Forte," "Schedule," "EBISS" "Bertie" and "Queue") are for identification purposes only. The embodiment is not limited to these names.

High-Level Description of the Filter Subsystem ASIC (FSS)

The Filter Subsystem (FSS) 102 manages the Cell Buffer, performs multicasting, generates empty cell timeslots for Operations Administration and Maintenance (OAM) cells and Available Bit Rate (ABR) Virtual Source (VS) forward resource management (f-RM) cells, and supports ABR explicit rate (ER) functions.

Figure 2:
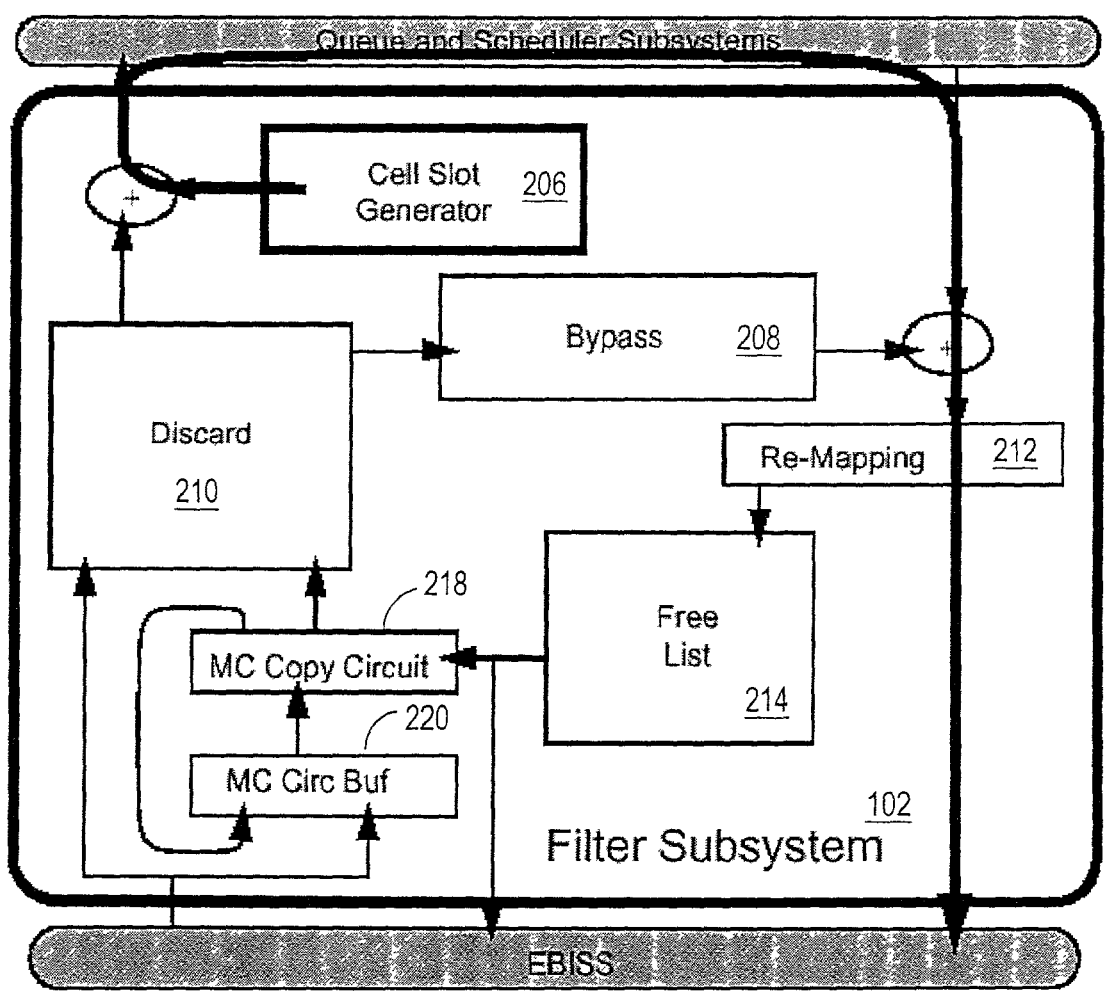
FIG. 2 is a high-level view of the FSS, in accordance with one embodiment of the present invention.

FIG. 2 is a high-level view of the FSS 102, in accordance with one embodiment of the present invention. User Data traffic flows from the Egress Backplane Interface Subsystem (EBISS) 112 through the Discard block 210 to the remainder of the Cell Control Path (Queue and Schedule Subsystems 110) and again through the FSS 102 to the EBISS 112.

Some of that traffic is removed from the stream in the Discard block 210. Traffic from the ABR Virtual Destination (VD) forward Resource Management (f-RM) stream and from the segmentation and reassembly (SAR) stream bypass the remainder of the Cell Control Path via the Bypass block 208. ABR and OAM cells generated by the Cell Slot Generator 206 flow through the remainder of the Cell Control Path, again through the FSS to the Egress Processor.

The free list block 214 manages cell pointers, which point to cell storage locations within the Cell Buffer. The multicast block 216 generates copies of cells by generating multiple cell descriptors (CDs) whose dummy cell pointers point to the original cell pointer and cell in the Cell Buffer.

The Discard block 210 manages usage of the Cell Buffer by selectively discarding cells as they arrive. The Discard block 210 also supports some ABR VS/VD and ER functions.

The cell slot generator 206 generates and inserts cell placeholders into which cells may be inserted by the Egress Processor Subsystem (EPSS). ABR Virtual Source (VS)f-RM slots are inserted at regular cell spacings into ABR VS connections to support ABR flow control. Each placeholder allows the ABR daughter card to insert one VS f-RM cell. The placeholder CD is inserted into the stream of user data CDs and traverses the Cell Control Path, and may be shaped prior to being passed to the EBISS 112. The Cell Slot Generator block maintains a cell counter for each ABR VS connection. The counter and the configurable cell spacing parameters for each ABR CID are stored in Discard RAM. The Cell Slot Generator also inserts OAM and other cells at the request of the EPSS via switch interface wire (SIFwire).

The Bypass block 208 provides two channels which bypass the remainder of the Cell Control Path. One channel is provided for SAR cells whose destination is the local CPU; the other is for ABR VD f-RM cells (not to be confused with VS f-RM cells) which are received from an upstream virtual source. Neither of those streams requires shaping.

The Remapping block 212 renaps MC dummy cell pointers to original cell pointers, returns cell pointers to the free list circular buffers, and maintains cell counters used by the Discard block 210.

High-Level Description of the Forte Subsystem ASIC

Figure 3:
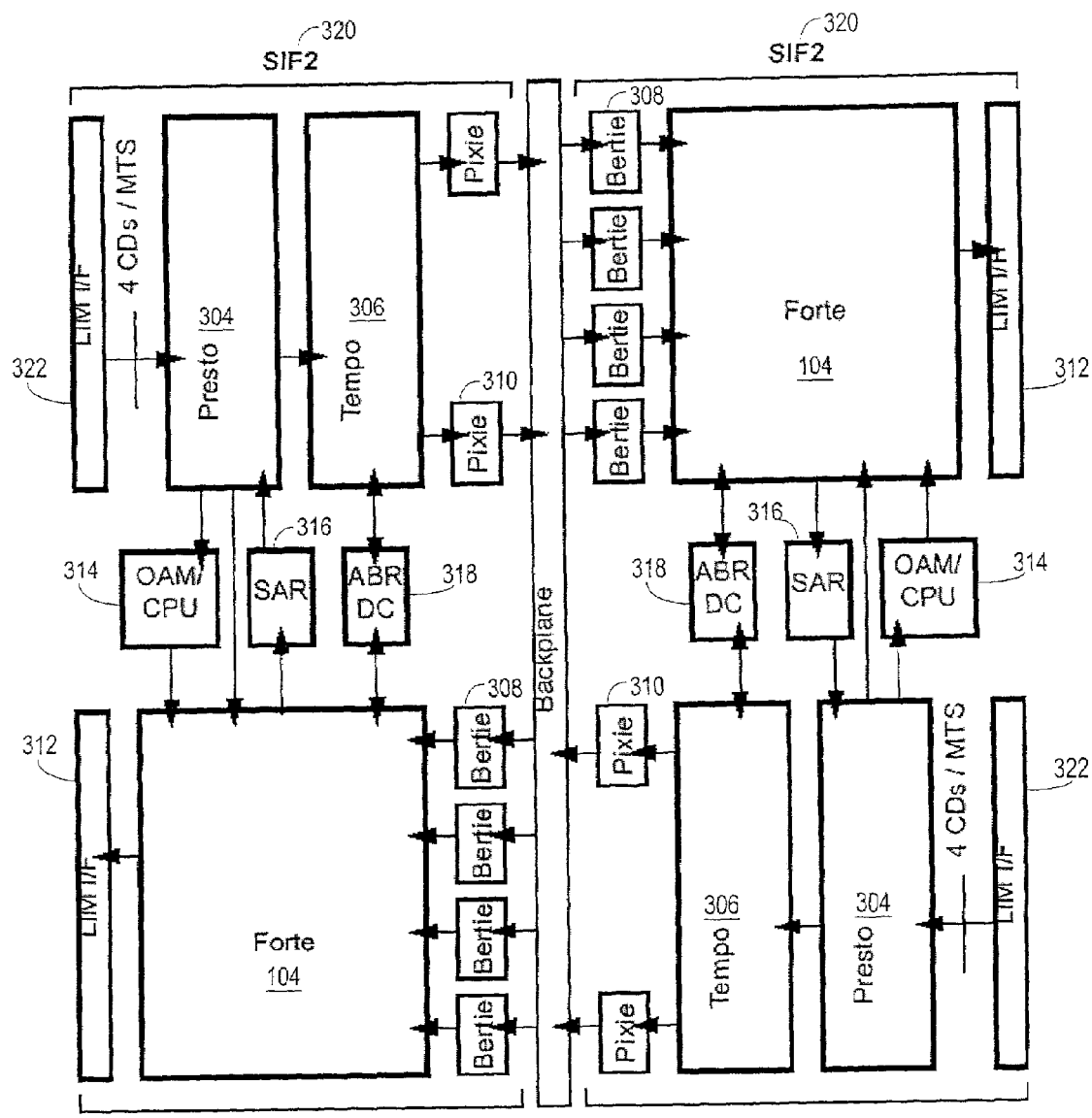
FIG. 3 is a high-level view of the environment of the Forte ASIC, in accordance with one embodiment of the present invention.

FIG. 3 is a high-level view of the environment of the Forte ASIC 104, in accordance with one embodiment of the present invention. The Presto ASIC 304 and Tempo ASIC 306 perform Ingress path processing. The Forte ASIC 104 performs Egress path processing. The Egress Backplane Interface Subsystem (EBISS) is shown in FIG. 1 and FIG. 2, respectively. The given names (e.g., "Presto," "Tempo," "Forte," "Bertie," and "Filter") are for identification purposes only. The embodiment is not limited to these names. FIG. 3 illustrates the relationships between Presto 304, Tempo 306, and Forte 104. Also shown is the relationships these ASICs have with the backplane and with associated Line Interface Modules (LIMs) 312 and 322 for two SIF2 boards in a common chassis. Cell data flows are indicated by arrows.

On egress, cell data and new cell descriptors come in from the BERTIEs 308. The cells are then transformed into a format suitable for transmission to the LIM interface 312 or SAR subsystem 316 before being transmitted to the LIM 312 or SAR 316.

Cells may be transmitted at a maximum rate of 2.4 Gbps. The 2.4 Gbps cell stream may consist of one single SONET OC-48c (concatenated) stream, four independent SONET OC-12 streams forming one SONET OC-48 port, or any combination of SONET OC-12 and lower rate streams. A maximum of 16 LIM ports may be configured.

Figure 4:
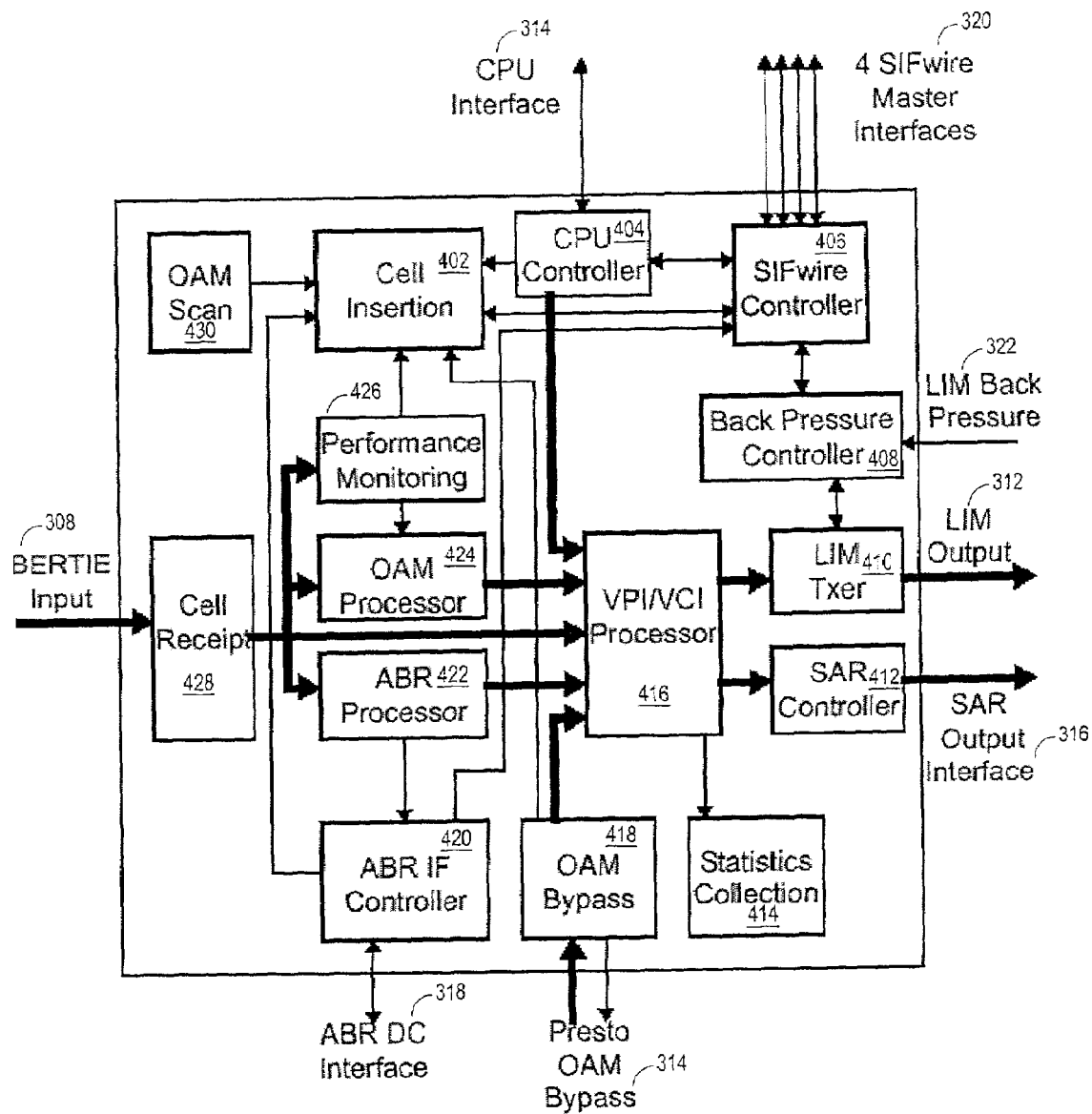
FIG. 4 shows the functional architecture for the Forte ASIC, in accordance with one embodiment of the present invention.

FIG. 4 shows the functional architecture for the Forte ASIC 104, in accordance with one embodiment of the present invention. The functions that the Forte 104 performs are grouped into the illustrated blocks (blocks 404 to 430), which are further discussed below with reference to FIG. 5, FIG. 6, FIG. 7, FIG. 8, FIG. 9, FIG. 10, and FIG. 11. The related external interfaces are shown. Cell paths are shown with bold lines. Control signals and data with light lines.

Cell Insertion

Figure 5:
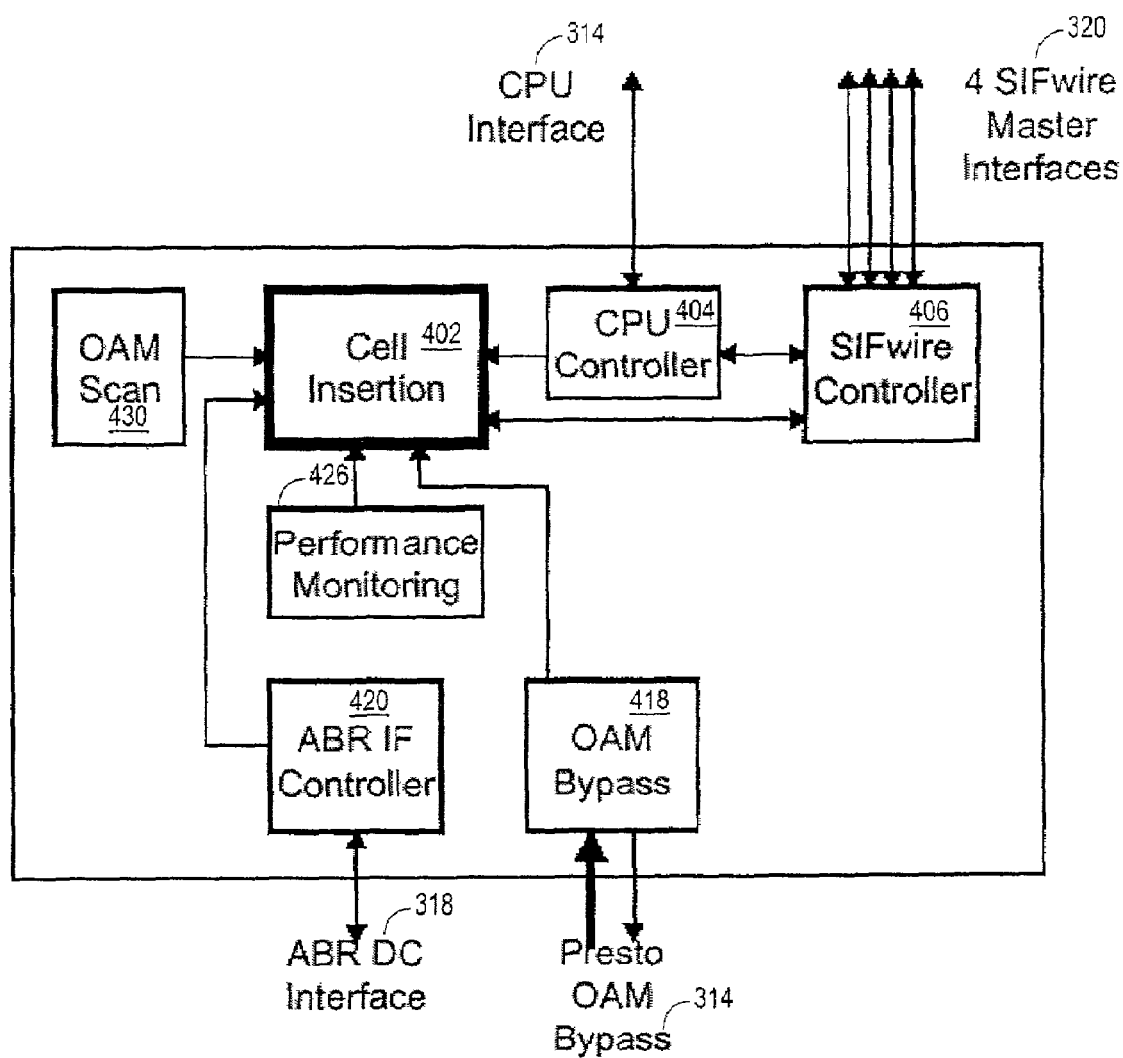
FIG. 5 shows the functional architecture of the Forte ASIC surrounding the cell insertion block, in accordance with one embodiment of the present invention.

FIG. 5 shows the functional architecture of the Forte ASIC 104 surrounding the cell insertion block 402, in accordance with one embodiment of the present invention. The Cell Insertion block 402 is responsible for requesting empty cell slots in the data flow from the Filter Subsystem 102. These requests can come from several sources, including the Performance Monitoring block 426, OAM Bypass 418, ABR daughtercard CABR DC) 318, CPU 404, and the OAM Scan 430.

Insertion requests to the FSS 102 are preferably made in the following priority order:

1. OAM Bypass block 418 (BRC and Backward Loopback OAM Insertion),
2. Performance Monitoring block 426 (FMC OAM Insertion),
3. ABR DC 420 (VS f-RM Cell Insertion),
4. CPU 404 (Cell Insertion),
5. CAM Scan 430 (AIS, RDI and CC Cell Insertion).

Each block will present the CID of their next cell insertion request, if they have one, to the Cell Insertion block 402. The Cell Insertion block 402 will take the request from the highest priority block (i.e., the OAM Bypass block 418) and perform a CID lookup in the Scan List 430 to obtain the information required to initiate an insertion request to the FSS 102. The information returned from the Scan List lookup 430 is shown below in below in Table 1.

TABLE 1

Example of Pseudo-Code of Information returned from the OAM Scan 430.

```
type ScanInfo is
   record
      QID[3:0];        -- QID - required by QSS
      PID[3:0];        -- PID - used to determine unshaped CID
      CPU Shaped;      -- CPU uses shaped CID
      Bypass-Shaped;   -- QAM Bypass uses shaped CID
   end record;
```

The Cell Insertion block then builds a SIFwire instruction using the Insertion request source and the ScanInfo. Table 2 below shows the different types of cells that can be requested.

TABLE 2

Example the different types of cells that can be requested from the Cell Insertion block 402.

| Cell Type Code | Description | Notes |
| --- | --- | --- |
| 0000-0001 | | reserved |
| 0010 | CPU | Cell Inserted by CPU |
| 0011 | OAM Bypass | Cell Inserted by OAM Bypass |
| 0100 | ABR DC VS f-RM | ABR f-RM Cell Inserted by ABR DC |
| 0101-0111 | reserved | |
| 1000 | AIS Segment | OAM Cell Inserted by Scan |
| 1001 | AIS End-to-end | OAM Cell Inserted by Scan |
| 1010 | RDI Segment | OAM Cell Inserted by Scan |
| 1011 | RDI End-to-end | OAM Cell Inserted by Scan |
| 1100 | CC Segment | OAM Cell Inserted by Scan |
| 1100 | CC End-to-end | OAM Cell Inserted by Scan |
| 1110 | FMC | OAM Cell Inserted by OAM Processor |
| 1111 | reserved | |

There are two schemes used for insertion requesting, both involve sending a SIFwire command to the FSS 102 and requesting a slot. The Sirwire command contains the information shown below in Table 3.

TABLE 3

Example of Pseudo-Code of Information Contained in a SIFwire command.

```
type FSS-Insertion_Data is
   record
      CellType[3:0];   -- Used to tell the Forte how to fill the cell
      CID[15:0];       -- CID used for the inserted cell
      QID[3:0];        -- QID used by the QSS
   end record;
```

The first scheme involves requesting the slot using the actual connection's CID. This ensures that the slots are shaped according to the connection's shaping parameters in the SSS 108.

The second scheme involves requesting the slots using 16 dedicated unshaped CIDs (one per port) that are not shaped. This requesting technique has the advantage that the cell slots travel through the Cell Control Path relatively quickly. The slots are not shaped according to the actual connections shaping parameters in the SSS 108. The CPU must configure the 16 connections in the system, and configure the base CID for the 16 connections, and which QID to use for the insertion request.

Most cell insertion requests are sent to the FSS 102 using the first scheme, so that the cells are inserted and shaped according to the connections parameters in the SSS 108.

ABR DC VS f-RM cell insertion requests are sent to the FSS 102 using scheme 2. The reason for using the second scheme is that it is possible for the ABR rate to have been reduced to 0. As a result, any cell inserted on the actual connection would never make it out of the SIF. So, there would be no way to increase the rate.

OAM Bypass 418 and CPU cell slot insertion requests can use either method. The "unshaped" flags in the Scan List 420 indicate which scheme to use.

ABR DC VS f-RM, OAM Bypass 418 and CPU cell insertions also have a timeout mechanism to prevent head of line blocking if the cell slot takes too long to get back to the Forte 104. The timeout counters are programmable 16 bit down counters. They start counting down when the cell insertion is sent to the FSS 102, when they reach zero the cell is discarded and the CPU is informed.

Each MTS, the Cell Insertion block 402 will send a request if it has one pending. The FSS 102 can always insert one insertion request every MTS. So, no feedback is required to indicate that the insertion was processed.

Figure 6:
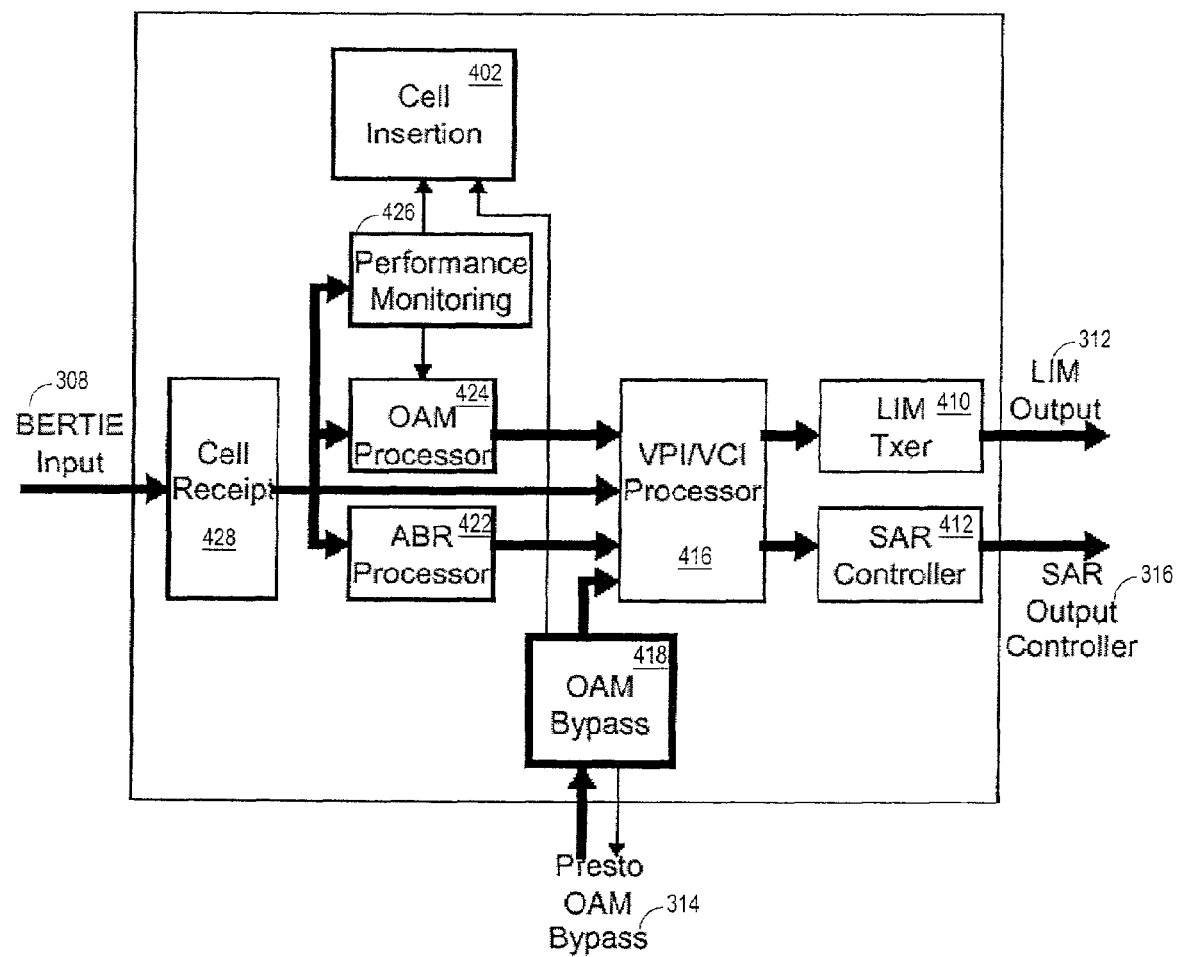
FIG. 6 shows the functional architecture of the Forte ASIC surrounding the OAM Bypass block 418, in accordance with one embodiment of the present invention.

FIG. 6 shows the functional architecture of the Forte ASIC 104 surrounding the OAM Bypass block 418, in accordance with one embodiment of the present invention. The OAM Bypass is described in relation to the insertion of looped back OAM cells from the Presto ASIC 304.

The OAM Bypass block 418 can receive one cell at a time, from the Presto 304, to be inserted in the Egress cell flow. The cell is sent to the Forte 104 across a 5 pin interface (4 data pins and one parity pin). The information received from the Presto is shown in Table 5 below.

TABLE 5

Example Pseudo-Code of Information Received by the
Forte ASIC 104 from the Presto ASIC 304

```
type Presto_DATA is
    record
        ICI[15:0];
        CellHeader array (1 to 4) of [7:0];
        CellPayload array (1 to 48) of[7:0];
    end record:
```

TABLE 4

Example Pseudo-Code of a Cell Insertion Request from
the Cell Insertion block 402.

```
RequestNextInsertion( )
    NoRequest <= FALSE;
    If      (OAM Bypass_Request = TRUE) then   -- BRC or Backward LB OAM
            Req.CellType <= OAM_Bypass;
            if(OAMBypass Unshaped = FALSE) then
                    Req.QID <= OAM-Bypass Request.QID;
                    Req.CID <= OAM-Bypass_Request.CID;
            else
                    Req.QID <= Unshaped.QID;
                    Req.CID <= UnshapedBase + ScanList.PID;
            end if;
    elsif   (Perfmon Request = TRUE) then   -- FMC Insertion
            Req.CellType <= FMC (SEG or E2E);
            Req.QID <= PerfMon Request QID;       -- from ScanList
            Req.CID <= PerfMon Request.CID;
    Elsif   (ABRDC Request = TRUE) then   -- VS f-EM cells
            Req.CellType <= FSS_ABR VS -fRM;
            Req.QID <= Unshaped.QID;
            Req.CID <= Unshaped.CID + ScanList.PID;
    elsif   (CPU Request = TRUE)          then -- Any type of cell
            Req.CellType <= CPU;
            if                            (CPU Unshaped = FALSE) then
                    Req.QID <= CPU_Request.QID;
                    Req.CID <= CPU_Request.CID;
            else
                    Req.QID <= Unshaped.QID;
                    Req.CID <= UnshapedBase + ScanList.PID;
            end if;
    elsif   (Scan_Request = TRUE) then-- AIS, RIM, CC OAM Cells
            Req.CellType <= AIS, RDI or CC;
            Req.QID <= Scan Request.QID;
            Req.CID <= Scan RequestCID;
    else
            NoRequest <= TRUE;
    end if;
    if(NoRequest = FALSE) then
            SendSIFwiretoFSS(Req);
    end if;
end RequestNextInsertion:
```

The ICI (Ingress Connection Identifier) is used to perform an ICI to CID lookup. Once the CID is known, the CID is presented to the Cell Insertion block 402. The Cell Insertion block 402 performs a lookup in the Scan Table in the OAM Scan block 430 to find out which insertion scheme to use for the insertion request and then issues the request to the FSS 102.

The OAM Bypass block 418 applies back pressure to the Presto 304 until the cell has been transmitted. This is because the Forte 104 can hold only one cell at a time.

When the cell is finally transmitted, the back pressure to the Presto 304 will be removed so that another cell can be looped back.

Note that it is the responsibility of the Presto 304 to format the cell correctly. The Forte 104 will perform VPI/VCI mapping and destination port lookup for all cells received via the bypass interface, but it will not modify any other part of the payload.

At the time the initial request is sent to the FSS 102, the OAM Timeout counter starts to decrement once per MTS. If the counter reaches zero, an OAM Timeout Interrupt will be sent to the CPU. This basically means that the insertion request has been lost. However, it is possible that the initial insertion request has just been seriously delayed and may eventually arrive at the Forte 104. The Forte 104 will discard any cells that are tagged with a CellType of OAMBypass if they do not match the appropriate CID.

The OAM Timeout initial value can be configured by the CPU. If this initial value is set to zero, then the timer will be disabled.

When an OAM timeout occurs, the cell in the Forte 104 will be discarded, and the request line to the Presto 304 will be asserted in order to get another cell.

OAM Scan

Figure 7:
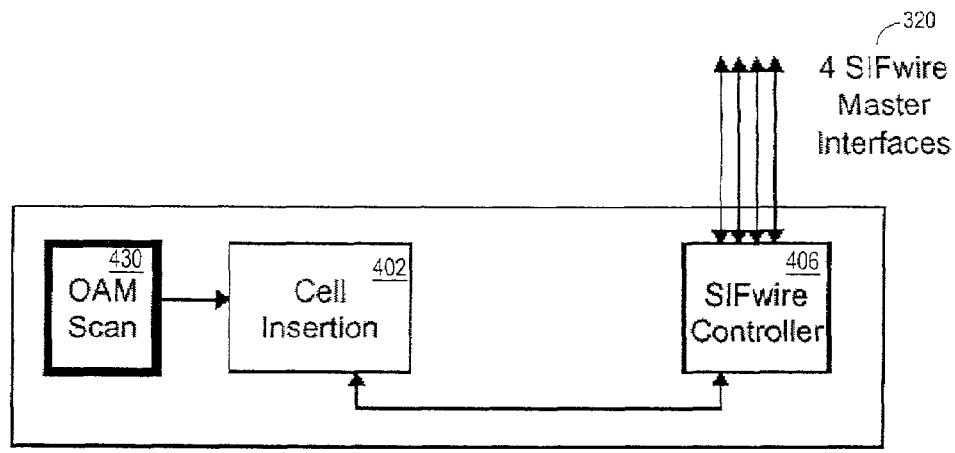
FIG. 7 shows the functional architecture of the Forte ASIC surrounding the OAM Scan block, in accordance with one embodiment of the present invention.

FIG. 7 shows the functional architecture of the Forte ASIC 104 surrounding the OAM Scan block 430, in accordance with one embodiment of the present invention. A set of OAM flags is maintained for each CID in a CID Scan lookup table held in the Statistics RAM. For each connection, a flag indicates which type of OAM cells should be inserted during "Scan". Table 6 below indicates the flags maintained per CID, and the type of cell generated.

TABLE 6

Examples of Flags Maintained Per Connection Identification (CID).

| Flag | Description |
| --- | --- |
| GenAISseg | Generate segment AIS |
| GenAISe2e | Generate end-to-end AIS |
| GenRDIseg | Generate segment RDI |
| GenRDIe2e | Generate end-to-end RDI |
| GenCCseg | Generate segment CC |
| GenCCe2e | Generate end-to-end CC |

The CPU initiates the scan by writing to the Forte 104. The Forte 104 scans the entire CID Scan table starting from CID 0, examining the set of OAM flags at each entry. Each set flag will cause the Forte 104 to request the FSS 102 to insert an OAM cell slot into the egress flow through the Cell Control Path using the first insertion scheme (always shaped to the actual CIDs shaping parameters). The OAM Scan block 430 presents the CID and CellType to the Cell Insertion block 402, which will issue the insertion request to the FSS 102 when there are no other insertion requests pending from any other block. The Scan List insertions have the lowest priority.

When the request has been processed by the Cell Insertion 402, the OAM Scan block 430 will move on to the next flag, so that the next request can be made. This step will continue until the entire scan list has been cycled through, at which point the CPU will be informed via an interrupt.

Note that no attempt is made to insert these OAM cells in a priority order based on QID. The reason is because there is no stringent timing requirement for these cell insertions other than that they are generated approximately once per second.

Performance Monitoring

Figure 8:
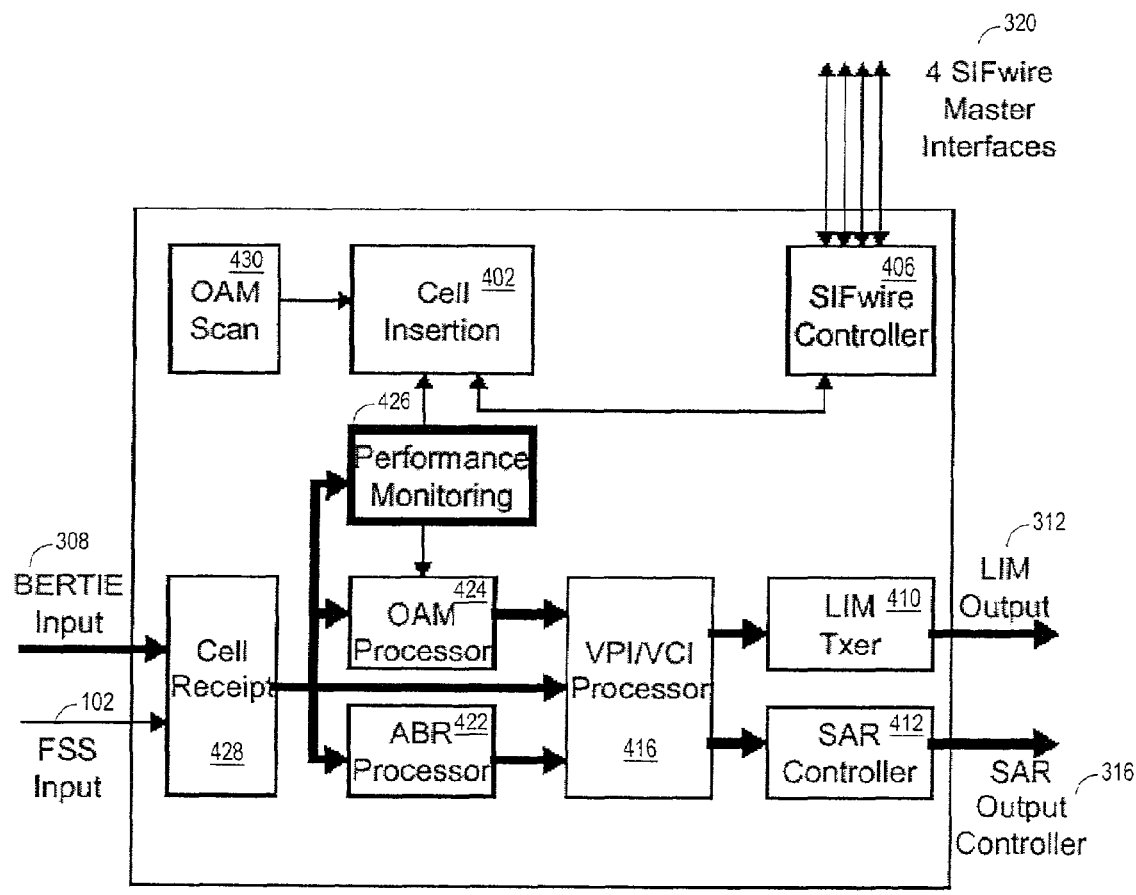
FIG. 8 shows the functional architecture of the Forte ASIC surrounding the Performance Monitoring block, in accordance with one embodiment of the present invention.

FIG. 8 shows the functional architecture of the Forte ASIC 104 surrounding the Performance Monitoring block 426, in accordance with one embodiment of the present invention. The Performance Monitoring block 426 in the Forte is responsible for requesting insertion of Forward Monitoring Cells (FMC) and maintaining fields for use in Performance Monitoring. This monitoring involves requesting insertion of Forward Monitoring Cell (FMC) slots from the FSS 102.

The Forte 104 can maintain Performance Monitoring (PM) on up to 511 Performance Monitoring Groups (PMG). Each PMG can consist of one or more connections. A connection is assigned to a PMG by the CPU writing the PMID into the CID lookup table, so that when the CID lookup is performed, the PMG can be determined.

Performance Monitoring on a particular group is initiated by the Forte 104 on command from the CPU. The CPU indicates the block size that will be used for the PMG. The block size is preferably 128, 256, 512 or 1024 cells.

TABLE 7

Example Pseudo-Code of Command to Start Performance Monitoring

```
function StartPMG( )
    PMGT(WhichPMG).Enabled <= TRUE;        -- set the Group enable bit
    PMGT(WhichPMG).First <= TRUE;          -- Ready for the first FMC
    SendFMCRequest(PMGT(WhichPMG).CID);    -- SIFwire request to FSS
    PMGT(WhichPMG).BlockCount <= 0;        -- Zero all of the counts
    PMGT(WhichPMG).BlockReqCount <= 0;
    PMGT(WhichPMG).MCSN <= 0;
    PMGT(WhichPMG).TUC <= 0;
```

TABLE 7-continued

Example Pseudo-Code of Command to Start Performance Monitoring

```
        PMGT(WhichPMG).TUCO <= 0;
        PMGT(WhichPMG).BEDC <= 0;
end StartPMG;
```

To initiate performance monitoring, the Forte 104 sends a command to the FSS 102 requesting the insertion of an OAM FMC on a particular CID. The FSS 102 will then insert an OAM FMC Cell Descriptor into the cell flow within one MTS.

When the inserted OAM EMC cell reaches the Forte 104, the Forte 104 will be aware that the OAM FMC cell is in fact the first FMC in the PMG. The Forte 104 will initialize all of the appropriate fields associated with the PMG and will insert them into the OAM FMC, so that it will be ready for transmission. Table 8 below shows shows the fields configured by the CPU for Performance Monitoring.

TABLE 8

Examples of OAM Forward Monitoring Fields Configured by the CPU

| Field Name | Meaning |
|---|---|
| Enable | Start performance monitoring |
| BlockSize[1:0] | Number of cells between FMC (128, 256, 512 or 1024) |
| F4_Level | Level of the block test (ie F4 for VPCs or F5 for VCCs) |
| Seg_E2E | Segment or End-to-end connection |
| CID[15:0] | CID to use for requested FMCs |

Table 9 below shows the fields configured and maintained by the OAM Processor.

TABLE 9

Examples of OAM Forward Monitoring Fields Configured by the OAM Processor

| Field Name | Meaning | Set by |
|---|---|---|
| First | First FMC through on PMG | Set when CPU sets Enabled, and cleared on first FMC. |
| BlockCount [15:0] | Number of cells since last FMC | set to 0 on every FMC, Inc after every "User Cell" in group. |
| BlockReq Count[15:0] | Number of cells since last request | set to 0 on First FMC, Inc after every "User Cell" in group, Cleared when count equals BlockSize |
| MCSN[7:0] | Monitoring Cell Sequence Number | set to 0 on first FMC, Inc after every FMC in group |
| TUC[15:0] | Total User Cell Count (CLP = 0 or 1) | set to 0 on first FMC, Inc after every "User Cell" in group. |
| TUC0[15:0] | Total User Cell Count (CLP = 0) | set to 0 on first FMC, Inc after every "User Cell" in group with CLP = 0. |
| BEDC[15:0] | Block Error Detection Code (BIP-16) | set to 0 on first FMC, modified during every "User Cell" |

When the first FMC goes through, the MCSN, TUC, TUCO, BEDC, BlockCount and BlockReqcount will be set to 0, and the "First" flag will be cleared.

TABLE 10

Example Pseudo-Code for Function for Requesting Forward Monitoring Cells

```
function RxFMC( )
    if(CellType = FMC) then
        WhichPMG <= CID.PMG -- from Egress RAM
        if(PMGT(WhichPMG).Enabled = TRUE) then
            -- is this the first FMC in the group?
            If(PMGT(WhichPMG).First = TRUE) then
                PMGT(WhichPMG).First <= FALSE;
            else -- not the first FMC
                -- Check for early FMC.
                if   (PMGT(WhichPMG).BlockCount < Blocksize/2) then
                    GeneratePMGUnderflowError( );
                end if;
                PMGT(WhichPMG).MCSN <= MCSN + 1;
            end if;
            FillFMC(WhichPMG);
            PMGT(WhichPMG).BEDC <= 0;
            PMGT(WhichPMG).BlockCount <= 0;
        end if;
    end if;
end RxFMC;
```

From then on, every "User Cell" associated with the PMG will cause the TUC, TUCO and BlockCount and BlockReqCount fields to be incremented, and the BEDC field to be updated. Once the BlockReqCount field has reached the BlockSize, another insertion request will be queued, and the BlockReqCount will be cleared. Up to four FMC insertion requests can be queued in any one MTS. The queue is maintained in the Statistics RAM and can hold 512 entries.

The worst case scenario, is for all 511 PMG to require requesting of FMC Insertions consecutively. This could happen over 128 MTSs. Every MTS the Forte can send a request to Filter, so it will only take 512 MTS (plus a few for OAM bypass insertions that are at a higher priority) to clear the back log. This should be sufficient as there has to be 128 user data cells before another request can take place (32 MTSs) and in that time 32 FMC requests should have been processed.

The head and tail of the queue are kept inside the Forte 104. The CID of the entry at the head of the queue is presented to the Cell Insertion block 402 until its request has been processed, then the next entry in the queue will be issued.

When the FMC arrives at the Forte 104, the TUC, TUCO and BEDC values will be written into it. The MCSN will be incremented and written into the cell, and the cell will then be ready for transmission.

TABLE 11

Example Pseudo-Code of Function for Filling a Forward Monitoring Cell

```
function FillFMC( )
    Cell.VPI <= CID.VPI;-- from Egress RAM
    if (PMGT WhichPMG .F4 Level = TRUE) then -- VP Connection
        if      (PMGT(WhichPMG).Seg E2E = Seg) then
            Cell.VC1 <= 3;
```

TABLE 11-continued

Example Pseudo-Code of Function for Filling a
Forward Monitoring Cell

```
        else
                Cell.VCI <= 4;,
        end if;
        Cell.PTI <= 000b
        Cell.CLP <= FSSData.CLP;
    else -- VC Connection
        Cell.VC1 <= CID.VCI;        -- from Egress RAM
        if(PMGT(WhichPMG).Seg E2E = Seg) then
                Cell.PTI <= 100b;
        else
                Cell.PTI <= 101b
        end if;
    end if;
    Cell.OAM-Type <= 0010b;
    Cell.FnType <= 0000b;
    Cell.MCSN <= PMGT(WhichPMG).MCSN;
    Cell.TUC <= PMGT(WhichPMG).TUC;
    Cell.BEDC <= PMGT(WhichPMG).BEDC;
    Cell.TUC0 <= PMGT(WhichPMG).TUC0;
    Cell.TSTP <= 0xFFFF;
    Cell.Unused <= Filled with 0x6As.
    Cell.TRCC0 <= 0x6A6A;
    Cell.BLER <= 0x6A.
    Cell.TRCC <= 0x6A6A;
    Cell.Res <= 000000b.
end FillFMC( )
```

If BlockCount is more then 1.5 times BlockSize or less then 0.5 time BlockSize when the FMC arrives an error will be raised to the CPU. Note that the Block Count is cleared when the FMC arrives. This continues until the CPU informs the Forte 104 that it should stop performance monitoring on the PMG.

To determine if a cell is a "User Cell," it is determined if the PMG is related to a F4 level connection. If so, then a "User Cell" is any cell that has a VCI that is 1, 2, 5 or VCI >=16. If the PMG is related to P5 level connection then a "User Cell" is any cell that has a PTI that is 0, 1, 2 or 3.

TABLE 12

Example Pseudo-Code of Function for Determining if
a Cell is "User Cell"

```
function CellRxed( )
    WhichPMG <= CID.PMG;
    if(WhichPMG <> 0) then
        if (PMGT(WhichPMG).Enabled = TRUE) then
            -- check for cell being a User Cell
            if((PMGT(WhichPMG).F4 Level = TRUE) and -- is a VPC
                ((Cell.VCI in (1, 2, 5)) or (Cell.VCI >= 16))) or
                ((PMGT(WhichPMG.F4 Level = FALSE) and -- is a
                VCC
                (Cell.PTI in (0, 1, 2, 3))) then
                -- check for late FMC
                if (PMGT(WhichPMG).BlockCount=1.5*BlockSize)
                then
                    GeneratePMGOverflowError( );
                end if;
                -- increment counts
                (PMGT(WhichPMG).BlockCount <=
                    (PMGT(WhichPMG).BlockCount + 1;
                PMGT(WhichPMG).BlockSizeCount <=
                    PMGT(WhichPMG).BlockReqCount + 1;
                PMGT(WhichPMG).TUC <=
                PMGT(WhichPMG).TUC + 1;
                if(Cell.CLP = 0) then
                    PMGT(WhichPMG).TUC0; <=
                        PMGT(WhichPMG)TUC0; + 1;
                end if;
```

TABLE 12-continued

Example Pseudo-Code of Function for Determining if
a Cell is "User Cell"

```
                PMGT(WhichPMG).BEDC <=
                    NewBEDC(Cell.Payload,
                                PMGT(WhichPMG).BEDC);
                end if;
                -- request next FMC
                if PMGT(WhichPMG).BlockReqCount =
                    PMGT(WhichPMG).Blocksize) then
                    PMGT(WhichPMG).BlockReqCount <= 0;
                SendFMCRequest(PMGT(WhichPMG).CID);
                end if;
            end if;
        end if;
    end if;
end CellRxed;
```

CPU Controller

Figure 9:
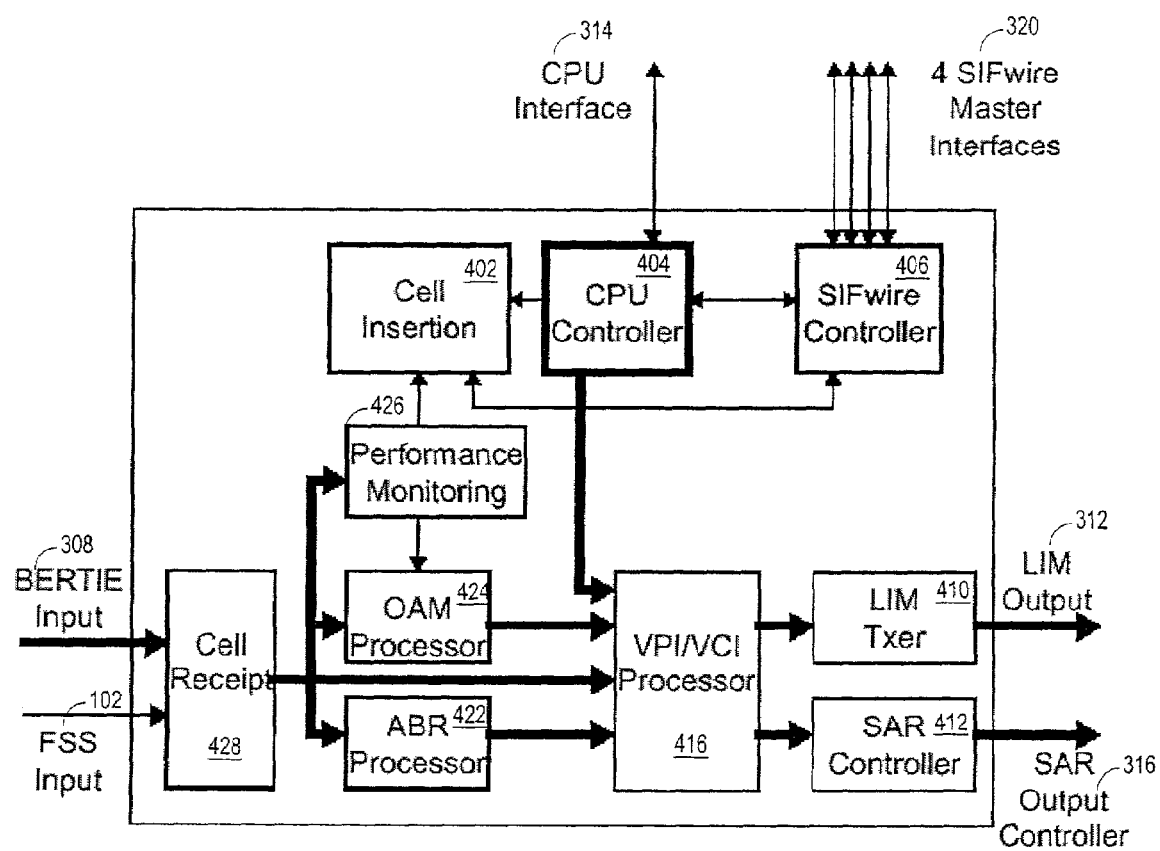
FIG. 9 shows the functional architecture of the Forte ASIC surrounding the CPU Controller block, in accordance with one embodiment of the present invention.

FIG. 9 shows the functional architecture of the Forte ASIC 104 surrounding the CPU Controller block 404, in accordance with one embodiment of the present invention. The CPU Controller 404 enables the CPU to insert cells into the egress cell flow. To do this the CPU must write the entire cell into the Forte 104. Once the CPU has written the entire cell into the Forte 104, the CPU can then request the insertion of the cell by writing the CID of the cell into the Insert Request Register, Once this is done., the CPU_INSERTION_BUSY flag will be set to indicate to the CPU that the cell has not been sent yet. The Cell Inserter will request the insertion at the next possible time.

When the cell slot reaches the Forte 104, the CPU's cell will be inserted and written into the Egress Cell Buffer ready for transmission to the LIM or SAR. Once the cell has been queued for transmission, the CPU INSERTION BUSY flag will be cleared, and the CPU Cell Sent interrupt will be generated, so that the CPU can proceed with the next request.

At the time that the initial request is sent to the FSS 102, the CPU Timeout counter starts to decrement once per MTS. If the counter reaches zero, a CPU Timeout Interrupt will be sent to the CPU. This basically means that the insertion request has been lost. However, it is possible that the initial insertion request has just been seriously delayed and may eventually arrive at the Forte 104. The Forte 104 will discard any cells that are tagged with a CellType of CPU if they do not match the appropriate CID.

There is no interrupt to indicate that there was a mismatch of CIDs as the CPU Timeout will have indicated that an insertion error has occurred. The CPU Timeout initial value can be configured by the CPU. If it is set to zero then the timer will be disabled.

Back Pressure Controller

Figure 10:
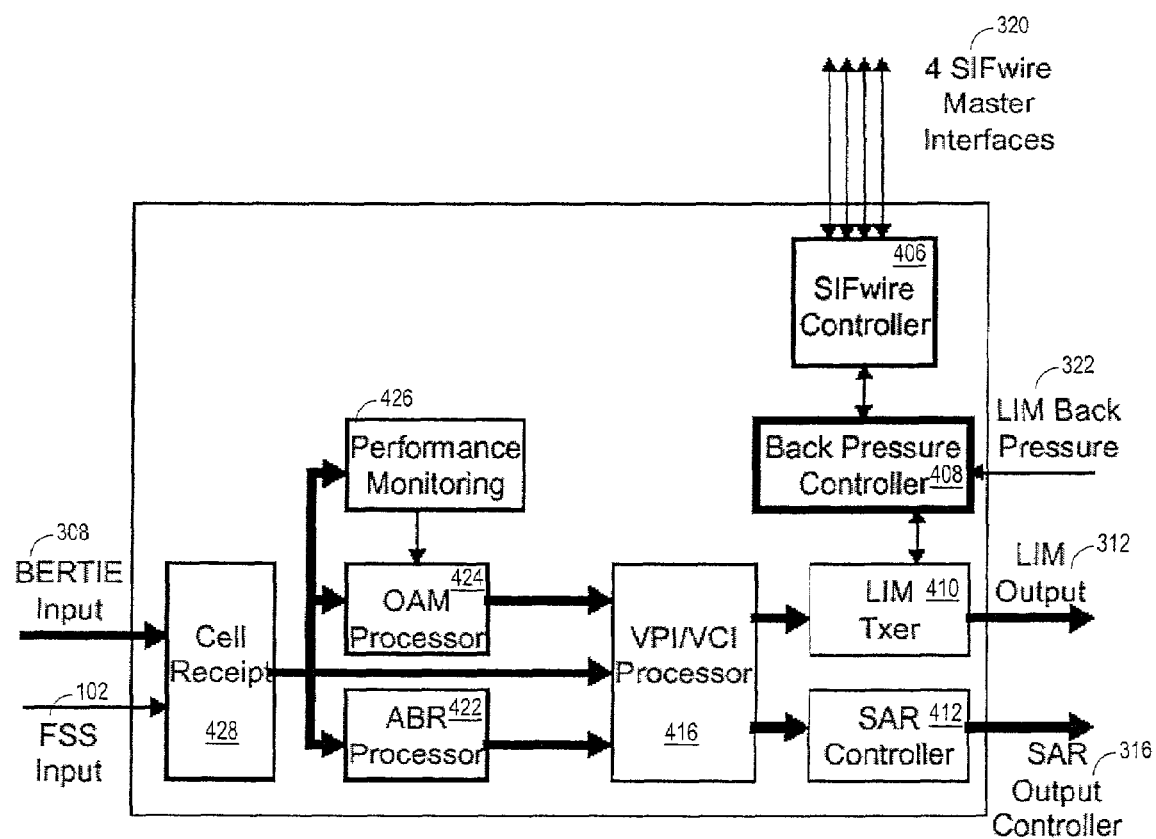
FIG. 10 shows the functional architecture of the Forte ASIC surrounding the Back Pressure Controller block, in accordance with one embodiment of the present invention.

FIG. 10 shows the functional architecture of the Forte ASIC 104 surrounding the Back Pressure Controller block 408, in accordance with one embodiment of the present invention. The Back Pressure Controller (BPC) receives back pressure state information from the LIM interface circuitry 322.

The BPC then applies that back pressure directly to the Egress Output Controller in the LIM Transmitter 410, Back pressure is also applied to the SSS 108, on a dedicated SIFwire channel, so that it will stop sending cells on certain ports.

If the LIM 312 indicates that a particular port is blocked, then the Forte 104 will stop sending cells to the LIM 312. Back pressure to the SSS 108 will only be applied when the number of cells stored in the Egress Cell Buffer is greater then or equal to half of the ports allocated buffer space. The back pressure is removed when the cells stored decreases below half.

For example, a 622 Mbps port is allocated buffer space for 16 cells. If the LIM Interface 322 applies back pressure on this port, the Forte 104 will apply back pressure to the SSS 108 when the number of full cells has reached 8, and will remove back pressure when the number of cells stored decreases below 8.

Back pressure from the LIM 322 is not applied directly to the SSS 108 in order to ensure that the LIM ports 312 do not get starved of traffic.

The CPU can also apply back pressure to the SSS 108 by writing to the CPU_BackPressure register. This back pressure will be combined with the back pressure from the Egress Cell Buffer before being sent to the SSS 108.

The backpressure information from the LIM 322 is protected by odd parity to ensure that the information is received correctly. If the parity is found to be incorrect then the information received is discarded, and the CPU is informed of the error.

SIFwire Controller

Figure 11:
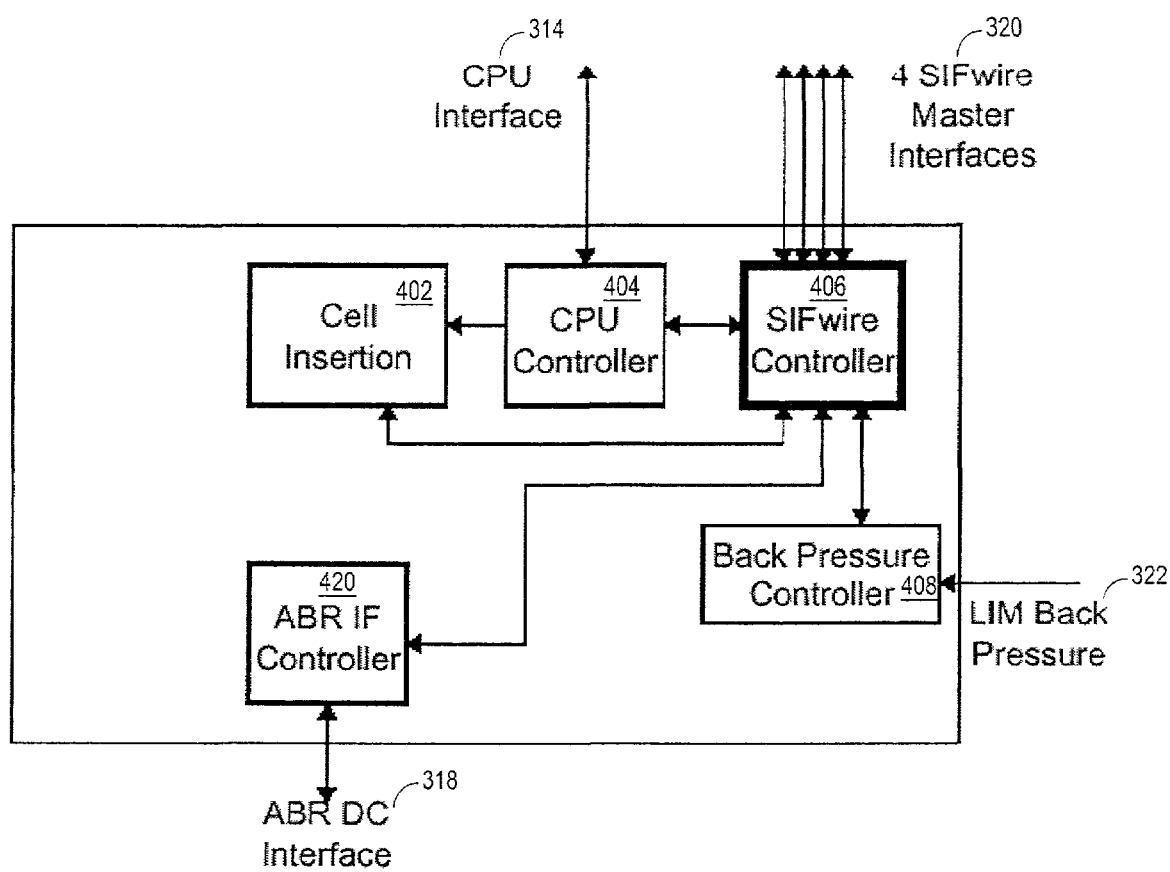
FIG. 11 shows the functional architecture of the Forte ASIC surrounding the SIFwire Controller, in accordance with one embodiment of the present invention.

FIG. 11 shows the functional architecture of the Forte ASIC 104 surrounding the SIFwire Controller 406, in accordance with one embodiment of the present invention. The SIFwire controller 406 controls which part of the Forte 104 has access to each of the four SIFwire channels on the Forte 104. Table 13 below shows the controller of each SIFwire channel.

TABLE 13

Examples of Controllers for each SIFwire Channel

| SIFwire Channel | Controlled by | Connected to |
| --- | --- | --- |
| 0 | CPU & ABRDC | SSS |
| 1 | Forte Back Pressure | SSS back Pressure |
| 2 | CPU & ABRDC | FSS |
| 3 | Forte Insertion Requester | FSS Insertion Requester |

SIFwires 0 and 2 can be accessed by both the CPU and the ABR DC. In the event of contention, the ABR DC is given priority. In the event of continued contention a configurable maximum of consecutive accesses is granted to the ABR DC then one access is provided for the CPU. The number of ABR DC accesses is controlled by the SIFwire control register.

The ABR DC and CPU will see separate banks of control registers for the SIFwire interface. A single bit flag in the serial frame format is used to identify the source of commands and the destination of the responses.

The Filter Subsystem 102 keeps per-port ABR counts for one QID that are generally collected by the ABR DC over the SIFwire interface. However, when a count exceeds some threshold, the FSS 102 will generate an unsolicited SIFwire response to transfer the PortID and ABR QID count.

The ABR DC interface expects this data on SIFwire 2 and will store the information in an array of registers. It will then interrupt the ABR DC to say that the information has arrived and set a bit, in the ABR-QID PORT register to indicate which count has been updated.

This unsolicited AER QID count facility is only available for SIFwire 2.

The other two SIFwire channels (channels 1 and 3) are completely controlled by the Forte 104. Channel 1 is used to supply back pressure information to the SSS 108, and channel 3 is used for requesting cell insertions from the FSS 102.

System and Method Implementation

Portions of the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMS, EPROMs, EEPROMs, DRAMS, VRAMS, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the preset invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, receiving an insertion request for an empty memory cell to be inserted into the data flow, receiving a base connection identification (CID) associated with the insertion request, determining an appropriate insertion scheme for carrying out the insertion request, and sending the insertion request to an insertion device configured to insert the empty memory cell into a main buffer for the data flow, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of inserting empty memory cells into a data flow of network connections of a computer network, the method comprising:

receiving during a predetermined period of time insertion requests for empty memory cells to be inserted into the data flow from a plurality of requesting sources, each of the requesting sources having a corresponding priority such that the insertion request from the highest priority source will be carried out;

determining an appropriate insertion scheme for carrying out the insertion request, wherein the appropriate insertion scheme includes a first insertion scheme configured to send the insertion request using a first indicator that the empty memory cell should be shaped using predetermined shaping parameters and a second insertion scheme configured to send the insertion request using a second indicator that the empty memory cell should be unshaped; and sending the insertion request to an insertion device configured to insert the empty memory cell into a main buffer for the data flow, the insertion request including the first indicator or the second indicator based on the appropriate insertion scheme determined.

2. The method of claim 1, further comprising receiving a base connection identification (CID) associated with the insertion request, wherein the first insertion scheme is configured to send the insertion request using the base connection identification (CID), wherein the base connection identification is associated with predetermined shaping parameters.

3. The method of claim 2, wherein the method further comprises shaping the empty memory cell according to the predetermined shaping parameters.

4. The method of claim 1, wherein the second insertion scheme is configured to send the insertion request using dedicated unshaped connection identifications.

5. The method of claim 4, wherein there are 16 unshaped connection identifications.

6. The method of claim 4, the method further comprising:
configuring the dedicated unshaped connection identifications for the computer network to obtain configured connection identifications;
configuring the base connection identification for the configured connection identifications;
configuring a cell type indication to be used for the insertion request; and
configuring a queue identification to be used for the insertion request.

7. The method of claim 1, wherein the insertion request is received from one of:
an operations and maintenance (OAM) device;
a performance monitoring device;
an available bit rate (ABR) device;
a central processing unit; or
an operations and maintenance scan device.

8. The method of claim 7, wherein the performance monitoring device and the operations and maintenance scan device each requires the insertion request to be carried out with the first insertion scheme.

9. The method of claim 1, wherein the an available bit rate (ABR) device requires the insertion request to be carried out with the second insertion scheme.

10. The method of claim 1, wherein the step of determining the appropriate insertion scheme comprises performing a lookup in a scan table.

11. The method of claim 1, wherein the step of sending the insertion request causes the empty memory cell to be transmitted through the data flow.

12. The method of claim 6, wherein the empty memory cell inserted by the insertion device carries the cell type indication.

13. An integrated circuit configured to insert empty memory cells into a data flow of network connections of a computer network, the integrated circuit comprising:
controller circuitry configured to control operations of:
receiving during a predetermined period of time insertion requests for empty memory cells to be inserted into the data flow from a plurality of requesting sources, each of the requesting sources having a corresponding priority such that the insertion request from the highest priority source will be carried out;
determining an appropriate insertion scheme for carrying out the insertion request, wherein the appropriate insertion scheme includes a first insertion scheme configured to send the insertion request using a first indicator that the empty memory cell should be shaped using predetermined shaping parameters and a second insertion scheme configured to send the insertion request using a second indicator that the empty memory cell should be unshaped; and
based on the appropriate insertion scheme, sending the insertion request to an insertion device configured to insert the empty memory cell into a main buffer for the data flow, the insertion request including the first indicator or the second indicator based on the appropriate insertion scheme determined.

14. The integrated circuit of claim 13, further comprising receiving a base connection identification (CID) associated with the insertion request, wherein the first insertion scheme is configured to send the insertion request using the base connection identification (CID), wherein the base connection identification is associated with predetermined shaping parameters.

15. The integrated circuit of claim 14, wherein the controller circuitry is further configured to control shaping the empty memory cell according to the predetermined shaping parameters.

16. The integrated circuit of claim 13, wherein the second insertion scheme is configured to send the insertion request using dedicated unshaped connection identifications.

17. The integrated circuit of claim 16, wherein there are 16 unshaped connection identifications.

18. The integrated circuit of claim 16, wherein the controller circuitry is further configured to control operations of:
configuring the dedicated unshaped connection identifications for the computer network to obtain configured connection identifications;
configuring the base connection identification for the configured connection identifications;
configuring a cell type indication to be used for the insertion request; and
configuring a queue identification to be used for the insertion request.

19. The integrated circuit of claim 13, wherein the insertion request is received from one of:
an operations and maintenance (OAM) device;
a performance monitoring device;
an available bit rate (ABR) device;
a central processing unit; or
an operations and maintenance scan device.

20. The integrated circuit of claim 19, wherein the performance monitoring device and the operations and maintenance scan device each requires the insertion request to be carried out with the first insertion scheme.

21. The integrated circuit of claim 13, wherein the an available bit rate (ABR) device requires an insertion request to be carried out with the second insertion scheme.

22. The integrated circuit of claim 13, wherein with the step of determining an appropriate insertion scheme, the controller circuitry is further configured to control performing a lookup in a scan table.

23. The integrated circuit of claim 13, wherein the step of sending the insertion request causes the empty memory cell to be transmitted through the data flow.

24. The integrated circuit of claim 18, wherein the empty memory cell inserted by the insertion device carries the cell type indication.

25. A computer-readable medium carrying one or more sequences of one or more instructions for inserting empty memory cells into a data flow of network connections of a computer network, the one or more sequences of one or more instructions including instructions which, when executed by one or more processors, cause the one or more processors to perform steps of:

receiving during a predetermined period of time insertion requests for empty memory cells to be inserted into the data flow from a plurality of requesting sources, each of the requesting sources having a corresponding priority such that the insertion request from the highest priority source will be carried out;

determining an appropriate insertion scheme for carrying out the insertion request, wherein the appropriate insertion scheme includes a first insertion scheme configured to send the insertion request using a first indicator that the empty memory cell should be shaped using predetermined shaping parameters and a second insertion scheme configured to send the insertion request using a second indicator that the empty memory cell should be unshaped; and based on the appropriate insertion scheme, sending the insertion request to an insertion device configured to insert the empty memory cell into a main buffer for the data flow, the insertion request including the first indicator or the second indicator based on the appropriate insertion scheme determined.

26. The computer-readable medium of claim 25, further comprising receiving a base connection identification (CID) associated with the insertion request, wherein the first insertion scheme is configured to send the insertion request using the base connection identification (CID), wherein the base connection identification is associated with predetermined shaping parameters.

27. The computer-readable medium of claim 26, wherein the instructions further cause the processor to perform a step of shaping the empty memory cell according to the predetermined shaping parameters.

28. The computer readable-medium of claim 25, wherein the second insertion scheme is a predetermined insertion scheme configured to send the insertion request using dedicated unshaped connection identifications.

29. The computer-readable medium of claim 28, wherein there are 16 unshaped connection identifications.

30. The computer-readable medium of claim 28, wherein the instructions further cause the processor to perform steps of:

configuring the dedicated unshaped connection identifications for the computer network to obtain configured connection identifications;

configuring the base connection identification for the configured connection identifications;

configuring a cell type indication to be used for the insertion request; and configuring a queue identification to be used for the insertion request.

31. The computer-readable medium of claim 25, wherein the insertion request is received from one of:

an operations and maintenance (OAM) device; a performance monitoring device;

an available bit rate (ABR) device; a central processing unit; or an operations and maintenance scan device.

32. The computer-readable medium of claim 31, wherein the performance monitoring device and the operations and maintenance scan device each requires the insertion request to be carried out with the first insertion scheme.

33. The computer-readable medium of claim 25, wherein the an available bit rate (ABR) device requires the insertion request to be carried out with the second insertion scheme.

34. The computer-readable medium of claim 25, wherein the step of determining the appropriate insertion scheme further causes the processor to perform a lookup in a scan table.

35. The computer-readable medium of claim 25, wherein the step of sending the insertion request causes the processor to perform a step of transmitting the empty memory cell through the data flow.

36. The computer-readable medium of claim 30, wherein the empty memory cell inserted by the insertion device carries the cell type indication.

37. A method of inserting empty memory cells into a data flow of network connections of a computer network, the method comprising:

receiving candidate insertion requests for empty memory cells to be inserted into the data flow from a plurality of requesting sources, each requesting source having a corresponding priority;

identifying an insertion request to be carried out from among the candidate insertion requests based upon the priority of its requesting source;

retrieving information for processing the insertion request from a data source using an identifier included with the insertion request;

determining an appropriate insertion scheme for carrying out the insertion request based upon its requesting source and the information from the data source, wherein the appropriate insertion scheme includes a first insertion scheme in which an empty memory cell should be shaped using predetermined shaping parameters and a second insertion scheme in which the empty memory cell should be unshaped; and sending an instruction for performing the insertion request to an insertion device configured to insert the empty memory cell into a main buffer for the data flow based on the appropriate insertion scheme determined.

* * * * *